United States Patent [19]
Gipson et al.

[11] Patent Number: 5,564,982
[45] Date of Patent: Oct. 15, 1996

[54] FLEXIBLE COUPLING WITH QUICK-DISCONNECT COUPLING HUBS

[76] Inventors: Alvin W. Gipson, P.O. Box 655; Michael J. Vizza, Sr., P.O. Box 1001, both of Blanchard, La. 71009

[21] Appl. No.: 238,241

[22] Filed: May 4, 1994

[51] Int. Cl.⁶ ............................................. F16D 3/64
[52] U.S. Cl. .................. 464/88; 403/223; 403/291; 464/147
[58] Field of Search .................. 464/88, 147, 153, 464/154, 155, 156; 403/220, 221, 223, 291

[56] References Cited

U.S. PATENT DOCUMENTS

| | | | |
|---|---|---|---|
| D. 240,327 | 6/1976 | Wright . | |
| 2,595,513 | 5/1952 | Cureton | 464/153 X |
| 2,681,552 | 6/1954 | Olson | 464/153 |
| 2,858,682 | 11/1958 | Fawick | 464/153 X |
| 2,867,102 | 1/1959 | Williams . | |
| 2,867,103 | 1/1959 | Williams | 464/88 |
| 2,907,188 | 10/1959 | Schmitter | 464/154 X |
| 2,918,809 | 12/1959 | Miller | 464/88 |
| 3,024,628 | 3/1962 | Yang | 464/88 |
| 3,068,663 | 12/1962 | Reed | 464/154 |
| 3,132,494 | 5/1964 | Hoffer | 464/156 X |
| 4,411,634 | 10/1983 | Hammelmann | 464/88 X |
| 4,473,359 | 9/1984 | Davis | 464/88 |
| 4,662,859 | 5/1987 | Sakai et al. | 464/88 |
| 5,139,460 | 8/1992 | Hoyt, III et al. | 464/88 |

FOREIGN PATENT DOCUMENTS 0294543  10/1991  Germany ........................ 464/147

OTHER PUBLICATIONS

T. B. Woods & Co Catalog entry– "Sure–Flex" Flexible Couplings, Sep., 1987 issue.

Primary Examiner—Daniel P. Stodola
Assistant Examiner—William A. Rivera
Attorney, Agent, or Firm—John M. Harrison

[57] ABSTRACT

A flexible coupling having quick-disconnect coupling hubs for connecting a drive shaft to an adjacently-aligned driven shaft and transmitting torsion from the drive shaft to the driven shaft responsive to rotation of the drive shaft, while accommodating misalignment of the shafts with respect to each other. In a preferred embodiment a cylindrical hub is slidably, adjustably mounted on each shaft by a key. An annular coupling flange is removably secured on each hub by a key, ALLEN screws or a snap ring. Each coupling flange receives the corresponding end of a resilient, elastomeric flexible connector which spans the coupling flanges to transmit torsion from the drive shaft to the driven shaft while accommodating misalignment of the shafts as the drive shaft is rotated.

18 Claims, 2 Drawing Sheets

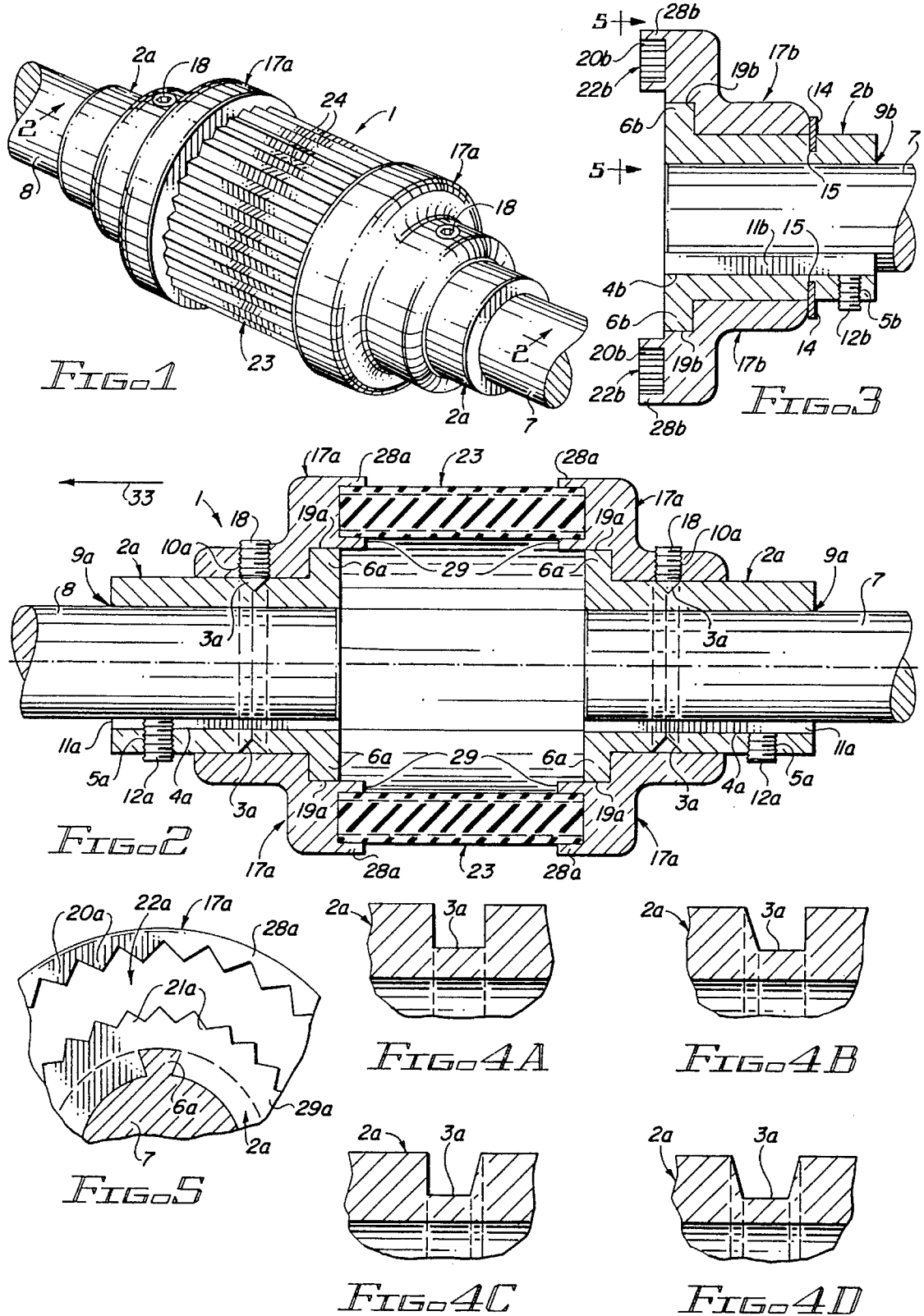

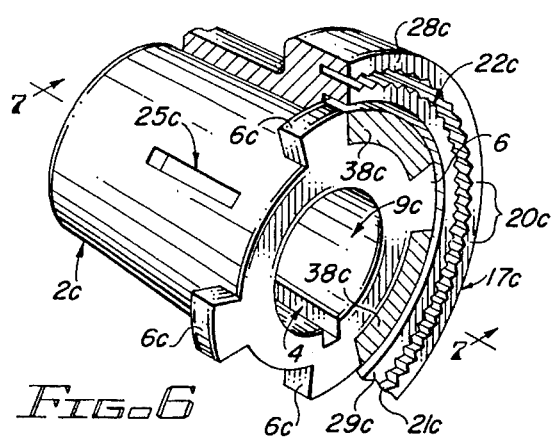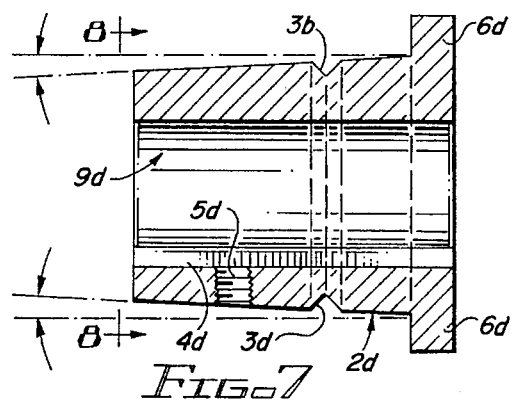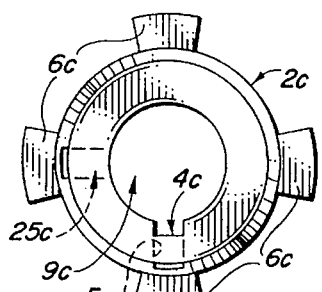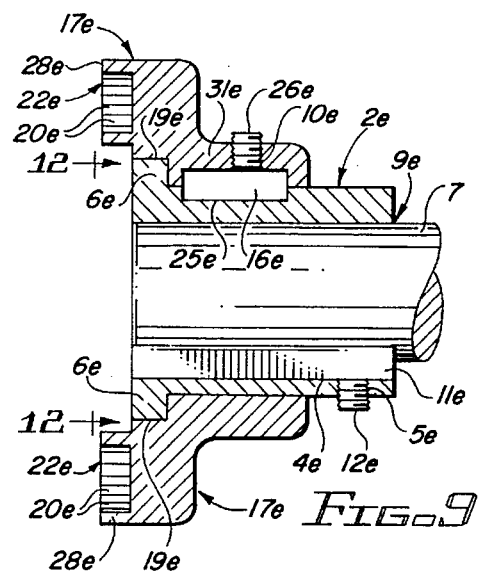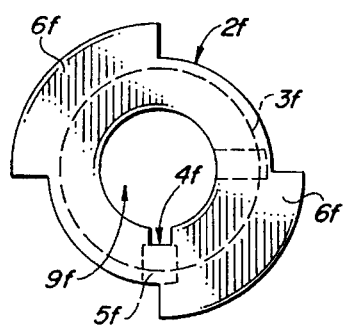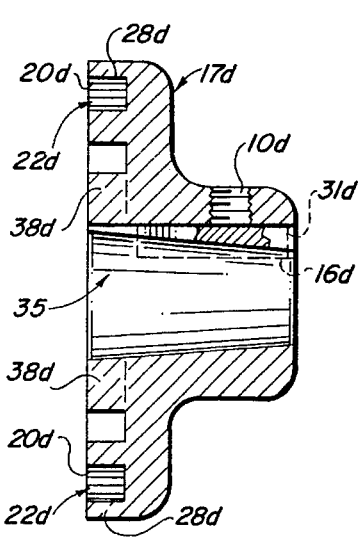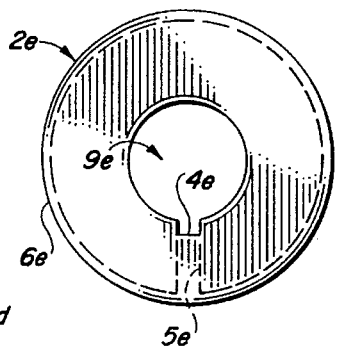

FLEXIBLE COUPLING WITH QUICK-DISCONNECT COUPLING HUBS

BACKGROUND OF THE INVENTION

1. Field of the Invention

This invention relates to flexible couplings for transmitting torsion from a drive shaft to a driven shaft while accommodating misalignment of the shafts with respect to each other and more particularly, to a flexible coupling having quick-disconnect coupling hubs designed to facilitate quick and easy replacement of the flexible connector element of the coupling when the flexible connector wears out or becomes damaged. In a first preferred embodiment of the invention the drive shaft and adjacently-aligned driven shaft each slidably receive a cylindrical hub adjustably mounted on the respective shaft by means of a key removably seated in a slot shaped in the shaft and an adjacently-aligned slot shaped in the hub. An annular coupling flange is then removably mounted on each hub by means of ALLEN screws threaded radially through the flange to reversibly engage a groove shaped circumferentially in the surface of the hub. Each coupling flange receives the corresponding end of a corrugated, elastomeric flexible connector which spans the coupling flanges to transmit torsion from the drive shaft to the driven shaft as the drive shaft is rotated. Inadvertent or operational misalignment or vibration of the shafts with respect to each other is accommodated by distortion of the resilient flexible connector. In a second preferred embodiment of the invention each coupling flange is removably seated on the corresponding hub by means of a split ring, removably mounted in an annular groove shaped circumferentially in the surface of the hub, for reversibly engaging the coupling flanges. In a third preferred embodiment each coupling flange is removably mounted on the corresponding hub by means of a key removably seated in a slot shaped in the hub and adjacently-aligned slot shaped in the coupling flange.

One of the problems encountered in using conventional flexible coupling devices is the requirement of complete or substantially complete disassembly of the coupling elements from the respective shafts in order to replace the flexible connector when the connector becomes damaged or worn. The flexible coupling with quick-disconnect coupling hubs of this invention represents a considerable improvement over such conventional flexible coupling devices due to the ease with which the flexible connector may be replaced. The hub and/or coupling flange elements of the flexible coupling can be slidably displaced on the respective shafts and the flexible connector disengaged from the coupling flanges and removed from the flexible coupling, by simply loosening the hub ALLEN screws or removing the snap ring which secures the coupling flange on the hub, such that disassembly and removal of the hub and coupling flange elements from the shaft is unnecessary.

2. Description of the Prior Art

Various devices for transmitting torsion from one shaft to another while compensating for misalignment between the shafts, are known in the art. U.S. Pat. No. 2,867,102, dated Jan. 6, 1959, to William A. Williams, describes "Flexible Coupling for Shafts" in which a flexible connecting member is mounted between socket members provided on opposing ends of respective shafts. The tubular connecting member is split longitudinally to facilitate removable connection with the socket members. The surfaces of the connecting member engage each other at the splits to interlock in such a way as to avoid distortion of the connecting member when under torsional strain. U.S. Pat. No. 2,867,103, dated Jan. 6, 1959, also to W. A. Williams, details "Gripping Arrangements For Flexible Couplings For Power Transmission Shafts" characterized by a flexible connector having end portions which cooperate with corresponding coupling hubs in a jamming action which tightens the connection between the connector and hubs. Since the end portions of the flexible connector do not extend beyond the respective hubs, the ends of the connector do not wrap around the hubs and pull the connector ends out of engagement with the hubs when the connector is subjected to torsional stress and deformation under working load. U.S. Design Pat. No. 240,327, dated Jun. 22, 1976, to Lewis E. Baer, illustrates a "Flexible Shaft Coupling". U.S. Pat. No. 4,304,501, dated Dec. 8, 1981, to William J. Gordon, et al, discloses a "Disconnect Gear Coupling" characterized by an internally-toothed sleeve which reversibly engages external teeth formed on a pair of hubs adapted to be mounted on driving and driven shafts. A travel screw is threadably seated in a bore provided in a flange mounted on the sleeve and extends axially with its outer end journaled and held against rotation in a bore provided in a support bracket which extends radially from the end of one of the hubs. Rotation of the travel screw shifts the sleeve axially to disengage the teeth of the opposite hub. U.S. Pat. No. 4,615,639, dated Oct. 7, 1986, to Ali Seireg, describes a "Key And Key Joint" including a key having a generally solid central portion and a pair of end portions, each including a pair of spaced longitudinal prongs. The key is assembled in the key joint with the slots defined by the longitudinal prongs extending from top to bottom through the key in a radial direction. A key joint thus assembled reduces the stress concentration factor attributable to a key joint assembled with a standard key to provide for a gradual transition between the strain of a shaft and the strain of a hub in torsion.

It is an object of this invention to provide a flexible coupling for connecting a drive shaft with an adjacently-aligned driven shaft and transmitting torsion from the drive shaft to the driven shaft responsive to rotation of the drive shaft.

Another object of this invention is to provide a flexible coupling in which misalignment or vibration of the drive shaft with respect to the driven shaft is accommodated by the resiliency of an elastomeric flexible connector.

Still another object of this invention is to provide a flexible coupling characterized by a pair of cylindrical hubs which are removably and adjustably mounted on respective drive and driven shafts and including an annular coupling flange reversibly and fixedly seated on each hub for receiving and engaging the corresponding end of an elastomeric flexible connector which spans the coupling flanges and transmits torsion from the drive shaft to the driven shaft responsive to rotation of the drive shaft.

Yet another object of this invention is to provide a flexible coupling including a flexible connector member which is axially mounted between a first coupling flange reversibly and fixedly seated on a hub mounted on a drive shaft and a second coupling flange similarly secured on a hub mounted on an adjacently-aligned driven shaft, which flexible connector may be quickly and easily removed from the coupling flanges for replacement by disengaging at least one coupling flange from the corresponding hub and sliding the coupling flange on the hub, or by disengaging at least one hub from the corresponding shaft and sliding the hub on the shaft.

SUMMARY OF THE INVENTION

These and other objects of the invention are provided in a flexible coupling with quick-disconnect coupling hubs for connecting a drive shaft to an adjacently-aligned driven shaft and accommodating operational misalignment or vibration of the shafts while transmitting torsion from the drive shaft to the driven shaft responsive to rotation of the drive shaft, which flexible coupling in one embodiment includes a cylindrical hub removably and adjustably secured on each shaft by means of a key removably accommodated in a slot shaped in the shaft and an adjacently-aligned slot shaped in the hub. An annular coupling flange is reversibly and fixedly seated on each hub by means of ALLEN screws threadably seated in respective screw receptacles extending radially through the flange, to reversibly engage an annular hub groove shaped circumferentially in the surface of the hub. An elastomeric sleeve or flexible connector is mounted axially between the coupling flanges to transmit torsion from the drive shaft to the driven shaft responsive to rotation of the drive shaft. In a second preferred embodiment each coupling flange is reversibly and fixedly seated on the corresponding hub by means of a snap ring, secured in an annular snap ring groove shaped circumferentially in the surface of the hub for reversibly engaging the flange. In a third preferred embodiment each coupling flange is reversibly and fixedly seated on the corresponding hub by means of a key removably accommodated in a slot shaped in the hub and adjacently-aligned slot shaped in the coupling flange.

BRIEF DESCRIPTION OF THE DRAWINGS

The invention will be better understood by reference to the accompanying drawings, wherein:

FIG. 1 is a perspective view of a first preferred embodiment of the flexible coupling with quick-disconnect coupling hubs of this invention;

FIG. 2 is a sectional view taken along line 2—2 of the flexible coupling illustrated in FIG. 1, more particularly detailing a key technique for removably mounting each hub on the corresponding shaft and an ALLEN screw technique for removably mounting each coupling flange on the corresponding hub;

FIG. 3 is a sectional view, also taken along line 2—2 of the flexible coupling illustrated in FIG. 1, more particularly detailing a snap-ring technique for removably mounting each coupling flange on the corresponding hub and a key technique for removably mounting each hub on the corresponding shaft;

FIG. 4A is an enlarged sectional view of the hub element of the embodiment of the flexible coupling illustrated in FIG. 1, more particularly detailing a hub groove shaped in each hub in square cross-sectional configuration;

FIG. 4B is an enlarged sectional view of a single-tapered hub groove of the embodiment of the flexible coupling illustrated in FIG. 1;

FIG. 4C is an enlarged sectional view of an alternative single-tapered hub groove of the embodiment of the flexible coupling illustrated in FIG. 1;

FIG. 4D is an enlarged sectional view of a double-tapered hub groove of the embodiment of the flexible coupling illustrated in FIG. 1;

FIG. 5 is an enlarged sectional view of the hub and flange elements of the flexible coupling, taken along line 5—5 in FIG. 3;

FIG. 6 is a perspective view, partially in section, of the coupling flange and keyed hub element in another preferred embodiment of the flexible coupling of this invention;

FIG. 7 is a longitudinal sectional view of a tapered hub element of still another preferred embodiment of the flexible coupling;

FIG. 8 is an end view of the tapered hub element taken along line 8—8 in FIG. 7.

FIG. 9 is a sectional view taken along line 2—2 of the flexible coupling illustrated in FIG. 1, more particularly detailing a key technique for removably mounting each coupling flange on the corresponding hub and each hub on the corresponding shaft;

FIG. 10 is an end view taken along line 8—8 of the tapered hub element illustrated in FIG. 7, more particularly detailing an alternative hub flange embodiment of the flexible coupling;

FIG. 11 is a sectional view of the coupling flange element of an alternative preferred embodiment of the flexible coupling of this invention; and FIG. 12 is an end view taken along line 12—12 of the hub element illustrated in FIG. 9.

DESCRIPTION OF THE PREFERRED EMBODIMENTS

Referring initially to FIGS. 1–12 of the drawings, in a first preferred embodiment the flexible coupling with quick-disconnect coupling hubs of this invention is generally illustrated by reference numeral 1. The flexible coupling 1 connects a drive or first shaft 7 with an adjacently-aligned driven or second shaft 8 and transmits torsion from the first shaft 7 to the second shaft 8, responsive to rotation of the first shaft 7. The flexible coupling 1 includes a pair of elongated hubs 2a–2f, each of which may have a substantially cylindrical configuration as illustrated in FIG. 2, or a tapered configuration as illustrated in FIG. 7. Each hub 2a–2f includes a central hub bore 9a–9f for slidably receiving the corresponding first shaft 7 or second shaft 8. As illustrated in FIG. 8, multiple hub flanges 6a–6d extend radially from the end of each hub 2a–2d with respect to each other about the circumference of the hub 2a–2d. As illustrated in FIG. 10, in an alternative embodiment, a pair of elongated or arcuate hub flanges 6f extend radially from the end of each hub 2f. An annular hub groove 3a, 3d, 3f, shaped circumferentially in the surface of each hub 2a, 2d, 2f adjacent to the hub flanges 6a, 6d, 6f, may have a V-shaped cross-sectional configuration as illustrated in FIG. 2, a square cross-sectional configuration as illustrated in FIG. 4A, a single-tapered cross-sectional configuration as illustrated in FIGS. 4B and 4C or a double-tapered cross-sectional configuration as illustrated in FIG. 4D. A conventional rectangular shaft key slot (not illustrated) is longitudinally shaped in the surface of the first shaft 7 and second shaft 8 and a first hub key slot 4a–4f is similarly shaped in the interior surface of the hub bore 9a–9f of each hub 2a–2f, as illustrated in FIGS. 8 and 10. An elongated, rectangular key 11a, 11b, 11e, slidably accommodated in each shaft key slot and corresponding, adjacently-aligned first hub key slot 4a–4f, removably rotatably locks each hub 2a–2f on the corresponding shaft, as illustrated in FIG. 2. A threaded ALLEN screw receptacle 5a–5f, extending radially through each hub 2a–2f and communicating with the corresponding first hub key slot 4a–4f, threadably receives a hub key ALLEN screw 12a, 12b, 12e for reversibly engaging and removably securing the key 11a, 11b, 11e in the shaft key slot and first hub key slot 4a–4f. An annular coupling flange 17a–17e, including a central flange bore 35, which may be cylindrical, as illustrated in FIGS. 2 and 3 or tapered, as illustrated in FIG. 11, receives and mounts on each hub 2a–2f. Multiple hub flange receptacles 19a, 19b, shaped in each coupling flange 17a, 17b, receive the respective hub flanges 6a, 6b, 6d provided on the corresponding hub 2a, 2b, 2d. As illustrated in FIGS. 3 and 5, a circular flange groove 22a–22e, shaped in each coupling flange 17a–17e, faces the flange groove 22a–22e shaped in the opposite coupling flange 17a–17e. Multiple, adjacent, exterior flange teeth 20a–20e are formed circumferentially on the inner surface of the exterior wall 28a–28e of each flange groove 22a–22e (as illustrated in FIGS. 3, 5 and 9) and multiple, interior flange teeth 21a, 21c are similarly formed on the interior wall 29a, 29c of each flange groove 22a–22e, as illustrated in FIG. 5. An elastomeric sleeve or flexible connector 23, constructed of a firm, yet resilient, material such as rubber or plastic and characterized by multiple, longitudinal corrugations 24, spans the coupling flanges 17a–17e, each end of the flexible connector 23 received in the correspondingly-shaped flange groove 22a–22e provided in the corresponding coupling flange 17a–17e, as illustrated in FIG. 2. The exterior flange teeth 20a–20e and interior flange teeth 21a, 21c of each flange groove 22a–22e are interposed between the respective corrugations 24 of the flexible connector 23. A threaded flange ALLEN screw receptacle 10a, extending radially through each coupling flange 17a, communicates with the corresponding hub groove 3a, 3d, 3f when the coupling flange 17a is located in proper position on the hub 2a, 2d, 2f for receiving the flexible connector 23. A flange ALLEN screw 18 is threaded in each flange ALLEN screw receptacle 10a for reversibly engaging the hub groove 3a, 3d, 3f and removably securing each coupling flange 17a on the corresponding hub 2a, 2d, 2f. The flexible connector 23 may be quickly and easily disengaged from each flange groove 22a–22e and removed from the flexible coupling 1 by rotating at least one flange ALLEN screw 18 to disengage the flange ALLEN screw 18 from the hub groove 3a, 3d, 3f and sliding at least one coupling flange 17a on the corresponding hub 2a, 2d, 2f in the direction indicated by the arrow 33, illustrated in FIG. 2. Alternatively, the flexible connector 23 may be removed by loosening at least one hub key ALLEN screw 12a and driving at least one coupling flange 17a and hub 2a as a unit on the corresponding shaft, also in the direction indicated by the arrow 33.

Referring now to FIG. 3 of the drawing, in a second preferred embodiment of the invention a snap ring 14 is secured in an annular snap ring groove 15, shaped circumferentially in the surface of the corresponding hub 2b for reversibly engaging and removably securing the corresponding coupling flange 17b on the corresponding hub 2b. Each hub 2b is removably secured on the corresponding shaft by means of a key 11b, as described above with respect to the first embodiment illustrated in FIG. 2. The flexible connector 23 may be disengaged from each flange groove 22b and removed from the respective coupling flanges 17b by removing one of the snap rings 14 from the snap ring groove 15 and sliding the corresponding flexible coupling flange 17b on the corresponding hub 2b, as required.

Referring next to FIGS. 6, 8–10 and 12 of the drawings, in a third preferred embodiment of the invention each hub 2c, 2e, 2f is removably secured on the corresponding shaft by means of a key 11a, 11b, 11e, as illustrated in FIG. 9 and described above with respect to the first embodiment of the invention. Each hub 2f, 2c, 2e is characterized by either two (FIG. 10), four (FIG. 8) or a single, continuous, annular hub flange 6f, 6c, 6e (FIG. 12), respectively, extending radially from one end of the hub 2f, 2c, 2e. As illustrated in FIG. 9, a continuous, annular hub flange receptacle 19e is correspondingly shaped in each coupling flange 17e for receiving the single, continuous hub flange 6e. A flange key slot 31d, 31e is shaped longitudinally in the interior surface of the flange bore 35 of each coupling flange 17c, 17d, 17e and a second hub key slot 25c, 25e is shaped longitudinally in the exterior surface of each hub 2c, 2e. A key 16d, 16e removably seated in each second hub key slot 25c, 25e and corresponding, adjacently-aligned flange key slot 31d, 31e, removably and slidably secures each coupling flange 17c, 17d, 17e on the corresponding hub 2c, 2e. A threaded flange ALLEN screw receptacle 10d, 10e, extending radially through each coupling flange 17c, 17d, 17e and communicating with the corresponding flange key slot 31d, 31e, threadably receives a key ALLEN screw 26e for reversibly engaging and removably securing the key 16d, 16e in the second hub key slot 25c, 25e and flange key slot 31d, 31e. The flexible connector 23 may be disengaged from each coupling flange 17c, 17d, 17e and removed from the flexible coupling 1 by loosening a key ALLEN screw 26e securing the key 16d, 16e which secures each coupling flange 17c, 17d, 17e on a hub 2c, 2e, and sliding the coupling flange 17c, 17d, 17e on the hub 2c, 2e, or by loosening a key ALLEN screw 26e securing the key 16d, 16e which secures the hub 2c, 2e on the corresponding shaft and driving the flexible coupling flange 17c, 17d, 17e and hub 2c, 2e combination on the shaft, as desired.

Referring next to FIGS. 6 and 11 of the drawings, in a fourth preferred embodiment of the invention the hub flange receptacles 19 (illustrated in FIG. 2) are omitted and four arcuate flange lugs 38c, 38d extend from the face of each coupling flange 17c, 17d in spaced relationship with respect to each other. Each flange lug 38c, 38d is removably positioned between two adjacent hub flanges 6c such that each hub flange 6c engages an adjacent flange lug 38c, 38d and thusly transmits torsion from the hub 2c to the corresponding coupling flange 17c, 17d as the corresponding shaft is rotated. Each coupling flange 17c, 17d may be removably keyed on the corresponding hub 2c (as illustrated in FIG. 9), or removably secured on the hub 2c by means of flange ALLEN screws 18 (as illustrated in FIG. 2) or a snap ring 14 (as illustrated in FIG. 3), as required. As illustrated in FIG. 11, the flange bore 35 is preferably tapered to accommodate a tapered hub 2d (illustrated in FIG. 7), to facilitate easier removal of the coupling flange 17c, 17d from the corresponding hub 2c when these parts are corroded or otherwise difficult to remove.

It will be understood that the exterior flange teeth 20a–20e and interior flange teeth 21a, 21c which span the flange groove 22a–22e in the flexible coupling flange 17a–7e are included in the drawing and application for purposes of illustration only, to accommodate a flexible connector 23 having corresponding corrugations 24. Flexible connector having alternative designs may also be accommodated by the opposed flexible coupling flange 17a–17e under circumstances where the exterior wall 28a–28e or other elements of the flexible coupling flange 17a–7e are shaped in a corresponding fashion.

While the preferred embodiments of the invention have been described above, it will be recognized and understood that various other modifications may be made in the invention and the appended claims are intended to cover all such modifications which may fall within the spirit and scope of the invention.

Having described my invention with the particularity set forth above, what is claimed is:

1. A flexible coupling for connecting a first shaft with a second shaft and transmitting torque from the first shaft to the second shaft responsive to rotation of the first shaft, said flexible coupling comprising a pair of elongated, substantially cylindrical hubs for slidably and adjustably mounting on the first shaft and second shaft, respectively; at least one hub flange extending radially from said pair of hubs, respectively; shaft-engaging means for removably fixedly seating said pair of hubs on the first shaft and second shaft, respectively; a pair of coupling flanges having an annular groove, respectively, said annular groove concentric with said pair of coupling flanges, respectively, said coupling flanges removably and slidably mounted on said pair of hubs, respectively; a plurality of teeth formed in said groove; at least one hub flange receptacle shaped in said pair of coupling flanges, respectively, for receiving said at least one hub flange; retaining means for removably mounting said pair of coupling flanges on said pair of hubs, respectively, and a flexible connector removably fitted in said groove and engaged by said plurality of teeth and connecting said pair of coupling flanges, whereby rotation of the first shaft causes rotation of said flexible connector and the second shaft.

2. The flexible coupling of claim 1 wherein said shaft-engaging means comprises a shaft slot shaped longitudinally in the first shaft and second shaft, respectively; a key slot shaped in said pair of hubs, respectively and positioned in adjacent relationship with respect to said shaft slot; a key removably and slidably accommodated in said shaft slot and said key slot; a key screw receptacle extending through said pair of hubs, respectively and communicating with said key slot; and a key screw threadably seated in said key screw receptacle for reversibly engaging said key.

3. The flexible coupling of claim 2 wherein said at least one hub flange comprises at least two hub flanges and said at least one hub flange receptacle comprises at least two flange receptacles receiving said hub flanges, respectively.

4. The flexible coupling of claim 2 wherein said retaining means comprises a hub groove shaped circumferentially in said pair of hubs, respectively, at least one flange screw receptacle extending radially through said pair of coupling flanges, respectively, adjacent to said hub groove and a flange screw threadably seated in said at least one flange screw receptacle for reversibly engaging said hub groove and removably securing said pair of coupling flanges on said pair of hubs, respectively.

5. The flexible coupling of claim 4 wherein said at least one hub flange comprises at least two hub flanges extending radially from said pair of hubs, respectively in diametrically-spaced relationship with respect to each other and said at least one hub flange receptacle comprises at least two hub flange receptacles for receiving said at least two hub flanges, respectively.

6. The flexible coupling of claim 2 wherein said retaining means comprises a snap ring groove shaped circumferentially in said pair of hubs, respectively and a snap ring mounted in said snap ring groove and engaging said pair of coupling flanges, respectively for removably mounting said pair of coupling flanges on said pair of hubs, respectively.

7. The flexible coupling of claim 2 wherein said retaining means comprises a hub slot shaped longitudinally in said pair of hubs, respectively, a flange slot shaped in said pair of coupling flanges, respectively and positioned in adjacent relationship with respect to said hub slot, a hub key removably accommodated in said hub slot and said flange slot, a flange screw receptacle extending radially through said pair of coupling flanges, respectively and communicating with said flange slot and a flange screw threadably seated in said flange screw receptacle for reversibly engaging said hub key.

8. The flexible coupling of claim 2 comprising a hub taper provided in said pair of hubs, respectively and a coupling flange taper provided in said pair of coupling flanges, respectively and matching said hub taper for fitting said pair of coupling flanges to said pair of hubs, respectively, in quick-release relationship.

9. The flexible coupling of claim 8 wherein said retaining means comprises a hub groove shaped circumferentially in said pair of hubs, respectively, at least one flange screw receptacle extending radially through said pair of coupling flanges, respectively, adjacent to said hub groove and a screw threadably seated in said at least one flange screw receptacle for reversibly engaging said hub groove and removably securing said pair of coupling flanges on said pair of hubs, respectively.

10. The flexible coupling of claim 8 wherein said retaining means comprises an annular snap ring groove shaped circumferentially in said pair of hubs, respectively and an annular snap ring mounted in said snap ring groove and engaging said pair of coupling flanges, respectively for removably mounting said pair of coupling flanges on said pair of hubs, respectively.

11. The flexible coupling of claim 8 wherein said retaining means comprises a hub slot shaped longitudinally in said pair of hubs, respectively, a flange slot shaped in said pair of coupling flanges, respectively and positioned in adjacent relationship with respect to said hub slot, a hub key removably accommodated in said hub slot and said flange slot, a flange screw receptacle extending radially through said pair of coupling flanges, respectively and communicating with said flange slot and a flange screw threadably seated in said flange screw receptacle for reversibly engaging said hub key.

12. The flexible coupling of claim 2 wherein said at least one hub flange comprises a single, continuous hub flange and said at least one hub flange receptacle comprises a continuous hub flange receptacle for receiving said hub flange.

13. The flexible coupling of claim 12 wherein said retaining means comprises a hub slot shaped longitudinally in said pair of hubs, respectively, a flange slot shaped in said pair of coupling flanges, respectively and positioned in adjacent relationship with respect to said hub slot, a hub key removably, slidably accommodated in said hub slot and said flange slot, a flange screw receptacle extending radially through said pair of coupling flanges, respectively and communicating with said flange slot and a flange screw threadably seated in said flange screw receptacle for reversibly engaging said hub key.

14. The flexible coupling of claim 13 comprising a hub taper provided in said pair of hubs, respectively and a coupling flange taper provided in said pair of coupling flanges, respectively and matching said hub taper for fitting said pair of coupling flanges to said pair of hubs, respectively, in quick-release relationship.

15. A flexible coupling for transmitting torque from a drive shaft having a drive shaft key slot to an adjacently-aligned driven shaft having a driven shaft key slot responsive to rotation of the drive shaft, said flexible coupling comprising a pair of hubs having hub bores for slidably and adjustably mounting said hubs on the drive shaft and driven shaft, respectively; at least two hub flanges extending radially from each one of said pair of hubs in circumferentially-spaced relationship with respect to each other; an annular hub groove shaped circumferentially in said each one of said pair of hubs in spaced, adjacent relationship with respect to said at least two hub flanges; a hub key slot shaped longitudinally in said each one of said pair of hubs and positioned in adjacent relationship with respect to said drive shaft key slot and said driven shaft key slot, respectively; a key removably and slidably accommodated in said drive shaft key slot, said driven shaft key slot and said hub key slot, respectively, for removably securing said pair of hubs on the drive shaft and driven shaft, respectively; a key screw receptacle extending radially through said each one of said pair of hubs and communicating with said key slot and said key; a screw threadably seated in said key screw receptacle for reversibly engaging said key; a pair of annular coupling flanges mounted on said pair of hubs, respectively, and at least two hub flange receptacles shaped in each one of said pair of coupling flanges for receiving said hub flanges, respectively, with a circular flange face disposed radially outwardly of said hub flange receptacles; a flange screw receptacle extending radially through said each one of said pair of coupling flanges adjacent to said annular hub groove and a screw threadably seated in said flange screw receptacle for reversibly engaging said hub groove and removably securing said each one of said pair of coupling flanges on the corresponding one of said pair of hubs; a circular flange groove shaped in said circular flange face of said pair of coupling flanges respectively and a plurality of flange teeth formed in said flange groove; and a corrugated, elastomeric flexible connector removably mounted in said flange groove and engaged by said plurality of flange teeth for connecting said pair of coupling flanges and transmitting torsion from the drive shaft to the driven shaft, responsive to rotation of the drive shaft.

16. The flexible coupling of claim 15 comprising a hub taper provided in each one of said hubs and a coupling flange taper provided in said each one of said pair of coupling flanges and matching said hub taper for fitting said each one of said pair of coupling flanges to said each one of said pair of hubs, respectively, in quick-release relationship.

17. A flexible coupling for facilitating connection of a drive shaft having a drive shaft slot with an adjacently-aligned driven shaft having a driven shaft slot and transmitting torque from the drive shaft to the driven shaft responsive to rotation of the drive shaft, said flexible coupling comprising a pair of elongated, substantially cylindrical hubs for slidably, adjustably mounting on the drive shaft and driven shaft, respectively; an annular, continuous hub flange extending radially from each one of said pair of hubs; a key slot shaped longitudinally in said each one of said pair of hubs and positioned in adjacent relationship with respect to said drive shaft slot and said driven shaft slot, respectively, and a shaft key removably and slidably accommodated in said drive shaft slot, said driven shaft slot and said key slot, respectively, for removably securing said pair of hubs on the drive shaft and driven shaft, respectively; a key screw receptacle extending radially through said each one of said pair of hubs and communicating with said key slot and a screw threadably seated in said key screw receptacle for reversibly engaging said key; a pair of annular coupling flanges mounted on said pair of hubs, respectively, and an annular, continuous hub flange receptacle shaped in each one of said pair of coupling flanges for receiving said hub flange, with a circular flange face disposed radially outwardly of said hub flange receptacle; a hub slot shaped longitudinally in said each one of said pair of hubs; a flange slot shaped in said each one of said pair of coupling flanges and positioned in adjacent relationship with respect to said hub slot; and a hub key removably and slidably accommodated in said flange slot and said hub slot for removably securing said each one of said pair of coupling flanges on the corresponding one of said pair of hubs; a flange screw receptacle extending radially through said each one of said pair of coupling flanges and communicating with said flange slot and a flange screw threadably seated in said flange screw receptacle for reversibly engaging said hub key; a circular flange groove shaped in said circular flange face of said pair of coupling flanges, respectively and a plurality of flange teeth formed in said flange groove; and a corrugated, elastomeric flexible connector removably mounted in said flange groove and engaged by said plurality of flange teeth for connecting said pair of coupling flanges and transmitting torsion from the drive shaft to the driven shaft, responsive to rotation of the drive shaft.

18. The flexible coupling of claim 17 comprising a hub taper provided in each one of said hubs and a coupling flange taper provided in each one of said pair of coupling flanges and matching said hub taper for fitting said pair of coupling flanges to said pair of hubs, respectively, in quick-release relationship.

* * * * *